May 6, 1924.

J. L. HOPE

INSECT DESTROYER

Filed Aug. 31, 1923

J. L. Hope, Inventor

By C. A. Snow & Co.

Attorneys

May 6, 1924.
J. L. HOPE
INSECT DESTROYER
Filed Aug. 31, 1923
1,492,727
2 Sheets-Sheet 2
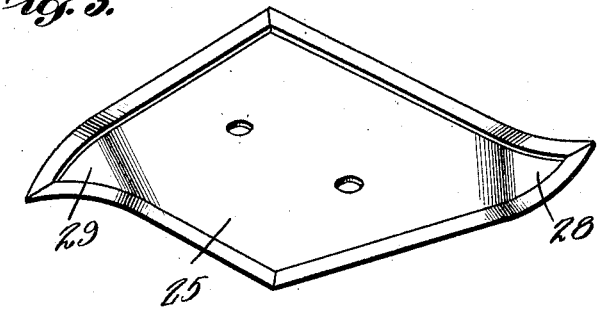
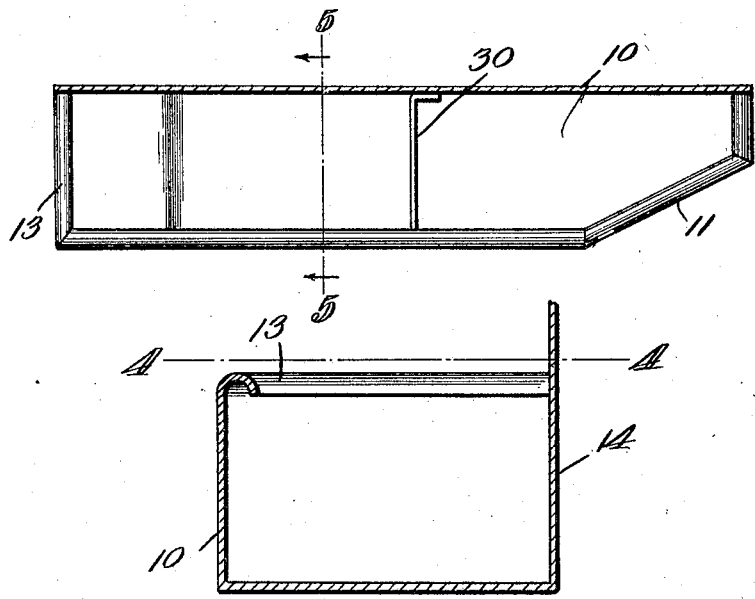
J. L. Hope, Inventor Patented May 6, 1924.

1,492,727

UNITED STATES PATENT OFFICE.

JOHN LOMAS HOPE, OF OAKFIELD, GEORGIA.

INSECT DESTROYER.

Application filed August 31, 1923. Serial No. 660,373.

*To all whom it may concern:*

Be it known that I, JOHN L. HOPE, a citizen of the United States, residing at Oakfield, in the county of Worth and State of Georgia, have invented a new and useful Insect Destroyer, of which the following is a specification.

This invention relates to insect destroyers of the type used as an attachment for plows and cultivators.

The object of the invention is to provide an attachment of this character constructed to knock off and gather boll weevil and punctured squares from cotton.

Another object is to provide an attachment of this character in which a plurality of wings are provided and made adjustable both vertically and laterally for use with cotton plants of different sizes.

Another object is to provide an attachment of this character including an insecticide container constructed so as to prevent splashing out of the liquid during the travel of the plow in cultivating.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed without departing from the spirit of the invention.

In the accompanying drawings:—

Fig. 3 is a detail perspective view of one of the wings.

Fig. 4 is a horizontal section taken on the line 4—4 of Fig. 5; and

Fig. 5 is a transverse section taken on the line 5—5 of Fig. 4.

Figure 1:
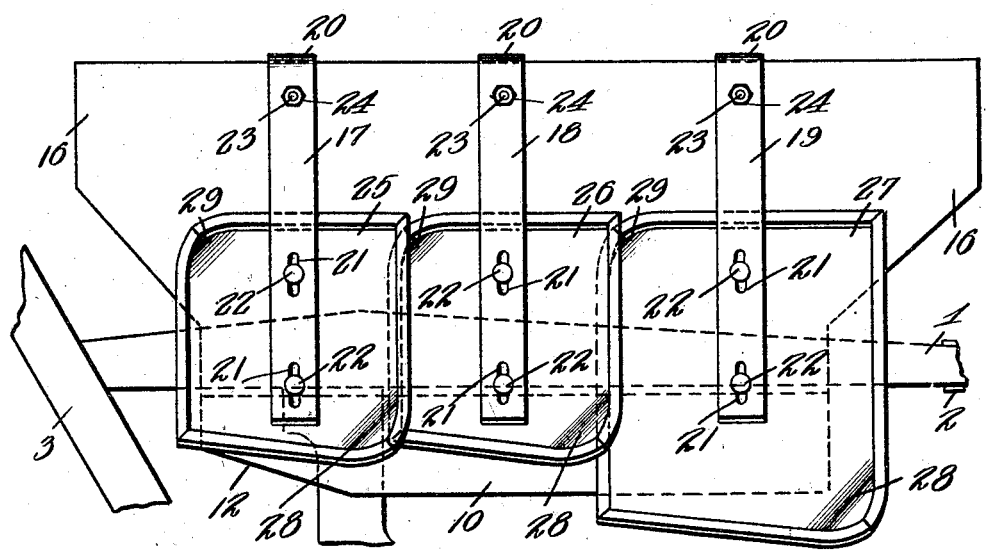
Figure 1 represents a side elevation of an attachment embodying this invention shown applied.

In the embodiment illustrated a plow stock 1 is shown having a clevis 2 at its front end and a handle 3 at its rear. The attachment constituting this invention is designed to be bolted to this stock, a plurality of metal straps 17, 18, and 19 being here shown for this purpose.

The attachment constituting this invention comprises an insecticide container 10 preferably constructed of sheet metal the outer side wall thereof being tapered toward its front end as shown at 11 and its bottom being inclined upwardly at its rear as shown at 12. The upper edges of the outer side wall and the ends of this container are rolled inwardly as shown at 13 to prevent splashing of the insecticide during the passage of the plow and also to prevent insects from crawling out of the container. The inclined front end 11 and bottom 12 also operate to prevent splashing.

The inner wall 14 of the container 10 has a laterally inclined extension 15 deflected away from the container the ends 16 of which extend longitudinally in planes beyond the ends of the container 10. The straps 17, 18, and 19 which are bolted to the stock 1 extend through openings in the extension 15 and are bent as shown at 20 and extended down over the outer side wall of container 10 and are adjustably connected with wings or bats 25, 26 and 27. The adjacent edges of these wings are arranged in lapping relation as shown in Fig. 1 and have their lower front corners 28 deflected to facilitate the passage over the plants without injuring them.

The straps 17, 18 and 19 are each provided in their other ends with longitudinally extending spaced slots 21 through which bolts 22 carried by the wings extend and which provide for the vertical adjustment of the wings to adapt them for use with plants of different heights. The front wing 27 is made larger than the others.

Figure 2:
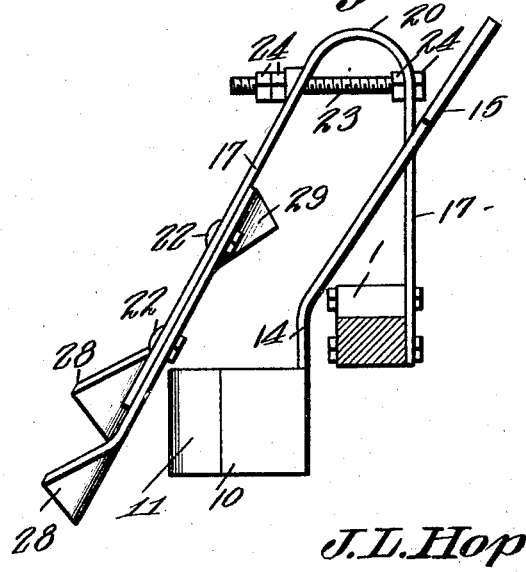
Fig. 2 is an end elevation thereof with the stock on which it is mounted shown in section.

The straps 17, 18 and 19 on which the wings are mounted are preferably made of resilient metal and have bolts 23 extending through the folded portions thereof as shown in Fig. 2 and are equipped with four nuts 24 operable to hold the bolts in adjusted position for varying the lateral location of the wings.

The upper rear corner of the wings 25, 26 and 27 are bent inward as shown at 29 against which the plants will strike during the passage of the plow or cultivator and thus shake off into the container 10 any insects or punctured squares.

The container 10 is preferably provided with a transversely arranged brace bar 30 to prevent spreading of the side walls.

This attachment may be connected with the stock or beam of any plow or cultivator by bolting the rear ends of the straps 17, 18 and 19 to this beam and when not desired for use may be readily removed.

The mounting of the wings on the resilient straps provides for their lateral movement so that in the passage over the plants they will operate as agitators to shake off the insects. The mounting of these wings on the downwardly and outwardly inclined ends of the straps positions the wings over the container as shown clearly in Fig. 2 so that the plants passing under them will be bent over the container and the insects and punctured squares will drop off into the container.

Various changes in the form, shape, proportion and other minor details of construction may be made without departing from the principle or sacrificing any of the advantages of the claimed invention.

I claim:—

1. An insect destroyer attachment for cultivators and the like comprising an insecticide container with agitators arranged to bend the plants over said container and to shake them while so bent, said agitators being in the form of lapping plates to provide shields to prevent insects from escaping during the passage of the destroyer over the plants.

2. An insect destroyer attachment for cultivators and the like comprising an insecticide container having its inner wall extended and deflected laterally away from the container, means for securing said container to a support, a combined plant agitator and insect shield extending over the outer wall and top of said container and spaced from said wall a distance sufficient for the passage of the plants between them.

3. An insect destroyer attachment for cultivators and the like comprising a trough-like container for an insecticide, means for securing said container to a support, a plurality of wings arranged at an incline over the top and outer wall of said container, said wings having their adjacent edges lapping, and resilient means for supporting said wings.

4. An insect destroyer attachment for cultivators and the like comprising a trough-like container for an insecticide, means for securing said container to a support, a plurality of wings arranged at an incline over the top and outer wall of said container, said wings having their adjacent edges lapping, resilient metal straps connected individually with said wings and adapted to be secured to a support, and adjusting bolts extending through said straps to adjust said wings laterally.

5. In a device of the class described an elongated insecticide container the inner wall of said container being extended upwardly and deflected laterally away from the container, substantially inverted V-shaped straps having one arm extended through said extended wall and adapted to be secured to a support, the other arms of said straps extending transversely of the container, wings secured to said last mentioned arms and made in the form of plates adjustable vertically thereon, said wings having their adjacent edges lapping.

6. In a device of the class described an elongated insecticide container the inner wall of said container being extended upwardly and deflected laterally away from the container, substantially inverted V-shaped straps having one arm extended through said extended wall and adapted to be secured to a support, the other arms of said straps extending transversely of the container, wings secured to said last mentioned arms and made in the form of plates adjustable vertically thereon, said wings having their adjacent edges lapping, the lower front corners of said wings being bent outwardly and the upper rear corners bent inwardly.

In testimony that I claim the foregoing as my own, I have hereto affixed my signature in the presence of two witnesses.

JOHN LOMAS HOPE.

Witnesses:
F. C. HALL,
G. C. WEATHEM.